A. M. BURTON.
FENDER.
APPLICATION FILED APR. 18, 1913.

1,195,438.

Patented Aug. 22, 1916.
2 SHEETS—SHEET 1.

WITNESSES:
M. P. McKee
Q. Kishnik

INVENTOR
A. M. Burton
BY
Alex. J. Wedderburn, Jr.
ATTORNEY

A. M. BURTON.
FENDER.
APPLICATION FILED APR. 18, 1913.
1,195,438.
Patented Aug. 22, 1916.
2 SHEETS—SHEET 2.
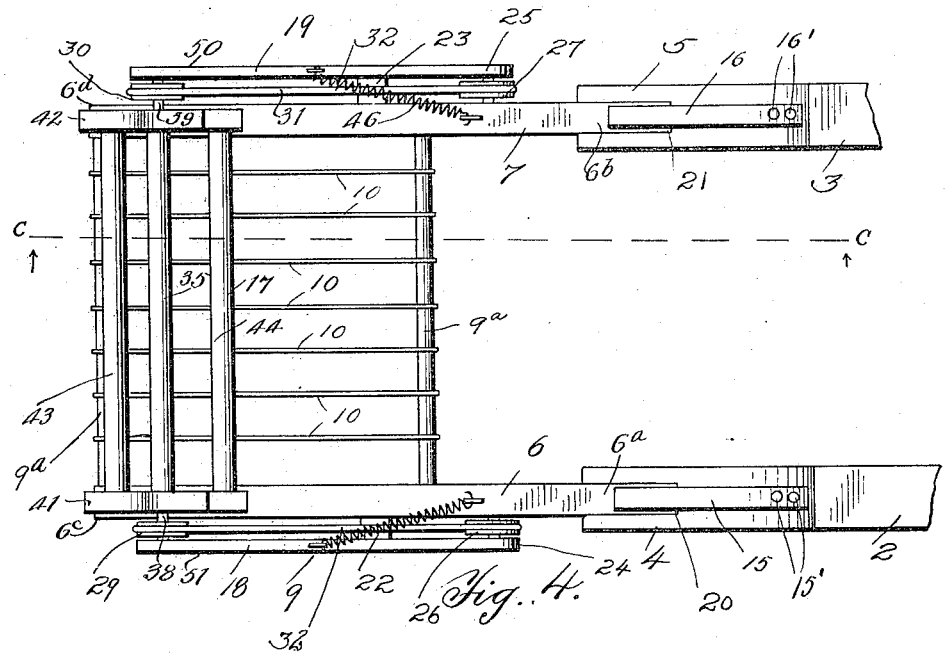
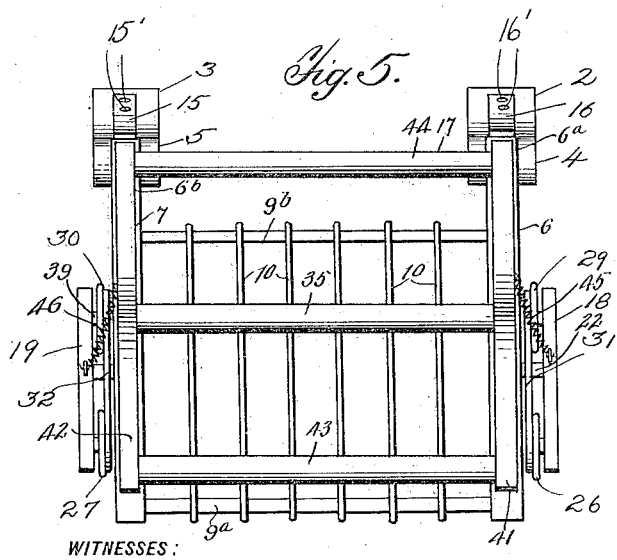
WITNESSES:
M. P. McKee
A. Kisluk
INVENTOR
A. M. Burton
BY
Alex. J. Wedderburn, Jr.
ATTORNEY

UNITED STATES PATENT OFFICE.

ALEXANDER M. BURTON, OF PITTSBURGH, PENNSYLVANIA.

FENDER.

1,195,438.

Specification of Letters Patent.

Patented Aug. 22, 1916.

Application filed April 18, 1913. Serial No. 762,063.

*To all whom it may concern:*

Be it known that I, ALEXANDER M. BURTON, a citizen of the United States, residing at Pittsburgh, in the county of Allegheny and State of Pennsylvania, have invented certain new and useful Improvements in Fenders, of which the following is a specification.

This invention relates to improvements in fenders adapted for the use of either street cars or automobiles and has for its object to provide means whereby a person caught on the fender will be held against falling therefrom.

Another object of the invention is to provide a car fender having a rotatable member adapted to overlie a person caught on the fender to prevent his falling therefrom.

With the above and other objects in view I have invented the device illustrated in the accompanying drawings in which—

Figure 1:
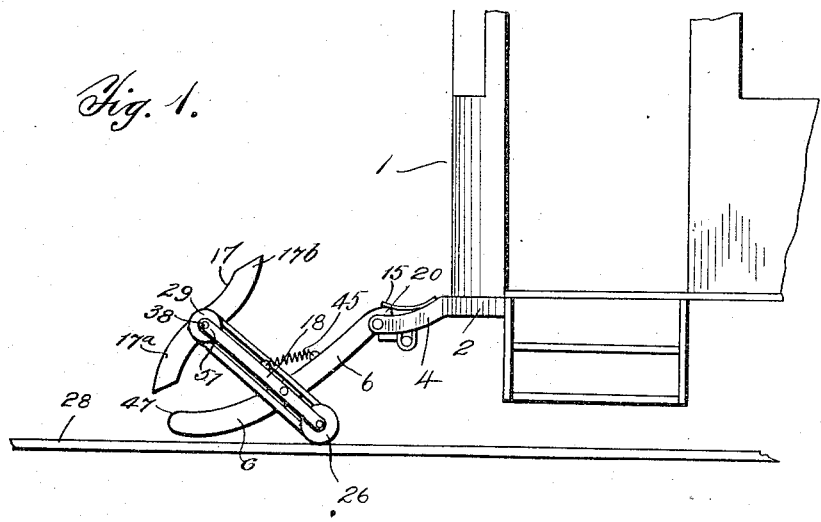
Figure 2:
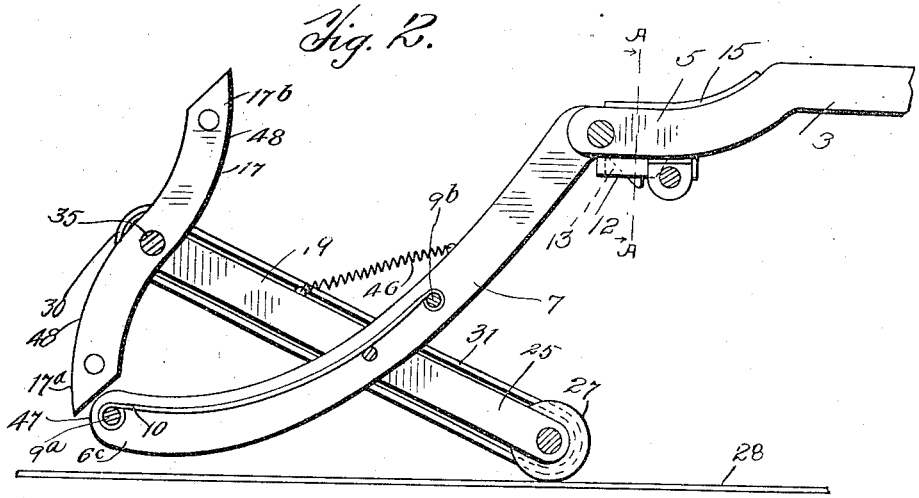
Figure 3:
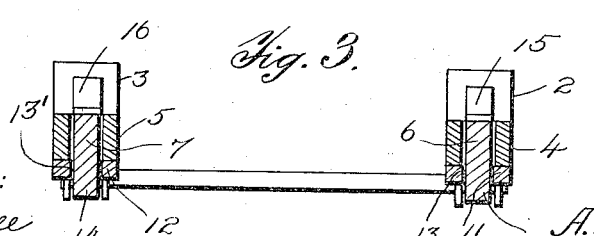

Figure 1 is an elevational view of the front end of a car showing my improved fender thereon in its normal position, Fig. 2 is an enlarged sectional view taken on line C—C Fig. 4, Fig. 3 is a sectional view taken on line A—A of Fig. 4, Fig. 4 is a top plan view of the fender, and Fig. 5 is a front elevational view of the device.

Like reference characters indicate like parts throughout the specification and in the several views in the drawings in which—

1 indicates a car provided with bracket members 2 and 3 having bifurcated ends 4 and 5 in which are pivotally mounted the inner ends 6ª and 6ᵇ of the arms 6 and 7 which are connected by transverse rods 9ª and 9ᵇ which form supports for the slats 10 whereby the scoop 9 is formed. Under the ends 4 and 5 are socket members 11 and 12 having recesses 13 and 13' into which the enlarged heads 14 and 14' of the arms 6 and 7 seat when the fender is in its normal position. Pivotally mounted on the upper surface of the brackets 2 and 3 are leaf springs 15 and 16 which engage the said enlarged heads 14 and 14' and hold them normally in place in said sockets whereby the fender is held in its normally raised position.

The outer ends 6ᶜ and 6ᵈ of the arms 6 and 7 are formed arcuate in order that the portions 17ª and 17ᵇ of the rotatable member 17 may rotate close to the slatted surface of said scoop. Supports 18 and 19 are pivotally mounted upon the arms 6 and 7 and carry said rotatable member 17 upon the upper ends thereof. The members 18 and 19 are pivotally connected to the arms 6 and 7 by means of members 22 and 23 which slightly offset the members 18 and 19 from said arms. The lower ends 24 and 25 of the members 18 and 19 are provided with wheels 26 and 27. Wheels 29 and 30 are fixedly mounted on the reduced ends 38 and 39 of the shaft 35 which connects the arms 41 and 42 of the rotatable member 17 whereby said member may be rotated upon said members 18 and 19, said reduced ends being journaled in the upper ends of the members 18 and 19. A belt 31 connects the wheels 27 and 30 and a similar belt 32 connects the wheels 26 and 29 whereby the rotation of the wheels 26 and 27 will cause the rotation of the wheels 29 and 30 and through them the member 17. Rods 43 and 44 connect the members 41 and 42. Coil springs 45 and 46 connect the upper portion of the members 17 and 18 to the upper portion of the arms 6 and 7 whereby the members 18 and 19 are held in normally raised positions.

The operation of the fender is as follows: Fig. 1 shows the normal position of the fender before being operated. When the extreme forward portion 47 of the scoop strikes a person on the tracks he is thrown toward the fender and in falling upon the scoop hits the forwardly projecting portion 48 of the member 17 causing the rotation of that member and breaking the fall of the person on to the scoop. When the body falls upon the scoop the latter is forced down toward the track 49 causing the wheels 25 and 26 to engage the tracks and thereby forcing the upper ends 50 and 51 of the members 18 and 19 downwardly. The wheels 26 and 27 after they have engaged the tracks 49 are caused to rotate by the forward movement of the car 1, this operates the belts 31 and 32 causing them to rotate the wheels 29 and 30 thus causing the rotation of the member 17, the portion 52 of which will engage the body of the person who has fallen upon the scoop and prevent the same from being jolted from the scoop. As soon as the person has been removed from the scoop the springs 15 and 16, and 45 and 46 will cause the fender to resume its normal position. The springs 15 and 16 may be rotated out of operative position if necessary in order that the fender may be lifted to its normal position after which the springs may be returned to normal position.

Having now described my invention that which I claim to be new and desire to procure by Letters Patent is:—

1. The described device consisting of a platform and a rotatable member mounted thereover, means whereby said platform may be held normally suspended and means whereby said platform may be caused to drop into contact with a roadbed, said platform having side arms with openings therein and carriers pivotally mounted in said openings and said rotatable member being mounted on said carriers.

2. The described device consisting of a platform and a rotatable member mounted thereover, means whereby said platform may be held normally suspended and means whereby said platfrom may be caused to drop into contact with a roadbed, said platform having side arms with openings therein and carriers pivotally mounted in said openings, said rotatable member being mounted on said carriers, a shaft for said member, pulleys on said shaft and means for rotating said pulleys.

3. The described device consisting of a platform and a rotatable member mounted thereover, means whereby said platform may be held normally suspended and means whereby said platform may be caused to drop into contact with a roadbed, said platform having side arms with openings therein and carriers pivotally mounted in said openings, said rotatable member being mounted on said carriers, a shaft for said member, pulleys on said shaft and means for rotating said pulleys, said means consisting of belts.

4. The described device consisting of a platform and a rotatable member mounted thereover, means whereby said platform may be held normally suspended and means whereby said platform may be caused to drop into contact with a roadbed, said platform having side arms with openings therein and carriers pivotally mounted in said openings, said rotatable member being mounted on said carriers, a shaft for said member, pulleys on said shaft and means for rotating said pulleys, said means consisting of belts, wheels on the lower ends of said carriers and pulleys on said wheels whereby said belts are operated.

5. The described device consisting of a platform and a rotatable member mounted thereover, means whereby said platform may be held normally suspended and means whereby said platfrom may be caused to drop into contact with a roadbed, said platform having side arms with openings therein and carriers pivotally mounted in said openings, said rotatable member being mounted on said carriers, a shaft for said member, pulleys on said shaft and means for rotating said pulleys, said means consisting of belts, wheels on the lower ends of said carriers and pulleys on said wheels whereby said belts are operated and means for preventing the rotation of said member.

6. The described device consisting of a platform and a rotatable member mounted thereover, means whereby said platform may be held normally suspended and means whereby said platform may be caused to drop into contact with a roadbed, said platform having side arms with openings therein and carriers pivotally mounted in said openings, said rotatable member being mounted on said carriers, a shaft for said member, pulleys on said shaft and means for rotating said pulleys, said means consisting of belts, wheels on the lower ends of said carriers and pulleys on said wheels whereby said belts are operated and means for preventing the rotation of said member, said means consisting of a pivoted bar having angular ends.

7. The described device consisting of a platform and a rotatable member mounted thereover, means whereby said platform may be held normally suspended and means whereby said platform may be caused to drop into contact with a roadbed, said platform having side arms with openings therein and carriers pivotally mounted in said openings, said rotatable member being mounted on said carriers, a shaft for said member, pulleys on said shaft and means for rotating said pulleys, said means consisting of belts, wheels on the lower ends of said carriers and pulleys on said wheels whereby said belts are operated and means for preventing the rotation of said member, said means consisting of a pivoted bar having angular ends, and means for holding said bar in a normally operative position.

In testimony whereof I affix my signature in presence of three witnesses.

ALEXANDER M. BURTON.

Witnesses:
GWENDOLYN BURTON,
THOMAS H. SANKEY,
FRANK M. SANKEY.